United States Patent Office 3,790,445
Patented Feb. 5, 1974

3,790,445
PRODUCTION OF OPTICALLY ACTIVE
ANTIPODES
Heinz Gibian and Klaus Kieslich, Berlin, Germany, Hans-Joachim Koch, Caracas, Venezuela, Horst Kosmol, Clemens Rufer, and Eberhard Schroder, Berlin, Germany, and Rosemarie Walsh, nee Vossing, Glendale, Calif., assignors to Schering Aktiengesellschaft, Berlin and Bergkamen, Germany
No Drawing. Continuation-in-part of application Ser. No. 578,996, Sept. 13, 1966, now Patent No. 3,562,112. This application Nov. 20, 1970, Ser. No. 91,552
Claims priority, application Germany, Sept. 14, 1965,
Sch 37,715
Int. Cl. C07c 167/00; C12d 13/00
U.S. Cl. 195—51 R               11 Claims

ABSTRACT OF THE DISCLOSURE

In a process for the production of optically active compounds, such as intermediates for the production of steroid hormones, in which an optically inactive compound of the formula

wherein $C_i$ is a symmetric carbon atom and the two Z groups are identical aliphatic groups joined together, each of which bears a keto group, and Y is the remainder of the molecule, is subjected to a microbiological enzyme system to produce an optically active antipode of the formula

wherein Y and Z have the values given above, $C_a$ is the asymmetrical carbon atom corresponding to $C_i$ and $Z'$ is a ligand otherwise corresponding to Z bearing a hydroxy rather than a keto group, the improvement which comprises employing a microorganism selected from the group consisting of *Aspergillus ochraceus*, *Bacillus esterificans*, *Bacillus thuringiensis* and *Saccharomyces uvarum*.

BACKGROUND OF THE INVENTION

This is a continuation-in-part of application Ser. No. 578,996, filed Sept. 13, 1966, now U.S. Pat. 3,562,112.

This invention relates to the production of optically active antipodes by the microbiological and/or enzymatic conversion of a symmetrical carbon atom of an organic compound into an asymmetrical carbon atom, and to certain novel products produced thereby.

Many pharmacologically active substances, such as cocaine, the 1-tropic acid of 1-hyoscyamine and scopolamine, α-aminoacids, steroid hormones, steroid alkaloids, cardiac glycosides, substituted malonic ester derivatives, and 1,3,5(10)-estratriene-3,17β-diol, as well as the intermediate compounds used in their production contain one or more asymmetrical carbon atoms. Moreover, clinical tests with these therapeutic agents almost always reveal that only one enantiomeric or diastereomeric form possesses the desired pharmacological effect, and that the racemate thereof generally shows at most half the effectiveness. Since the opposite form may even exhibit undesired side effects, it is desirable to obtain the optically active antipode in a pure state.

U.S. 3,432,393 teaches a process for the production of steroid intermediates employing different microorganisms. The instant process produces surprisingly better results over those achieved with the organisms employed in the examples of U.S. 3,432,393, i.e., *Rhizopus arrhizus* Fischer (ATCC 11145), *Saccharomyces cerevisiae* Hansen, *Streptomyces platensis* MacGuire (NRRL 2364) and *Pseudomonas aeruginosa* ATCC No. 10145. The microbiological conversion can be conducted at higher substrate levels, in shorter fermentation times and/or produces a purer bioconversion product. This can be seen by a comparison of Example 7 of U.S. 3,432,393 with Example 2 which follows. The former uses *Rhizopus arrhizus* as the microorganism. The substrate concentration is only 120 mg. per liter of fermentation broth. The fermentation period is 54 hours. No data as to yield and the melting point of the product is given. Only the optical rotation is given, i.e., $[\alpha]_D = -22.5°$ (chloroform, c.=2). In Example 2 which follows, the fermentation is conducted with *Saccharomyces uvarum* CBS 1508. With this microorganism, a substrate concentration of 1,500 mg. per liter is employed. In spite of this high substrate concentration, the fermentation period employed is only 25 hours. The yield is at least 71%. The thus-obtained product is crystalline and has a sharp melting point (M.P. 108–109° C.). Its optical rotation $[\alpha]_D = -34.5°$ (dioxane); $[\alpha]_D -64°$ (chloroform, c.=2), a substantially higher value than the value given in U.S. 3,432,393.

It is apparent from a comparison of these two examples that with the microorganism employed in the instant process, it is possible to operate at a much higher (more than 10 times) substrate concentration. Moreover, in spite of the high substrate concentration, the reaction period is substantially less (25 hours vs. 54 hours). In the instant process, the substrate conversion is more than 60 mg. per liter of fermentation broth per hour whereas with the organism employed in U.S. 3,432,393, a substrate conversion rate of only 2.2 mg./per liter/per hour was attained.

A comparison of the optical rotations of the respective products demonstrates that the product produced according to the instant process has a higher degree of purity than the product produced according to the patented process. Another indication of the production of a less pure product is the fact the patent does not disclose a characterizing melting point.

OBJECTS OF THE INVENTION

It is a principal object of this invention to provide an improved microbiological process for the conversion of an optically inactive organic compound as defined herein into an optically active antipode.

A further object of this invention is to provide an improved microbiological process for the conversion of an optically inactive organic compound as defined herein into an optically active antipode of a relatively pure state.

An additional object of this invention is to provide an improved microbiological process for the conversion of an optically inactive compound as defined herein into an optically active antipode at higher substrate concentrations, in higher yields and/or at higher conversion rates.

Other objects will be apparent to those skilled in the art to which this invention pertains.

SUMMARY OF THE INVENTION

According to this invention an optically inactive compound of the formula

(I)

wherein $C_i$ is a symmetric carbon atom and the two Z groups are identical aliphatic groups joined together, each of which bears a keto group, and Y is the remainder of the molecule, is subjected to a microbiological enzyme system to produce an optically active antipode of the formula

(II)

wherein Y and Z have the values given above, $C_a$ is the asymmetrical carbon atom corresponding to $C_i$ and $Z'$ is a ligand otherwise corresponding to Z bearing a hydroxy group, in the position occupied by the keto group of Z, employing a microorganism selected from the group consisting of *Aspergillus ochraceus, Bacillus esterificans, Bacillus thuringiensis Saccharomyces uvarum* and *Saccharomyces chevalieri*.

DETAILED DISCUSSION

The substituent Y is desirably a saturated or unsaturated aliphatic or cyclic hydrocarbon residue which can, if desired, be interrupted by one or more hetero atoms, such as, for example, an oxygen, nitrogen or sulphur atom. The hydrocarbon residue can additionally be substituted by halogen atoms, free or functionally modified keto, hydroxyl, carboxyl, or amino groups. It is particularly desirable to employ starting compounds in which Y is alkyl containing 2 to 20, preferably 3 to 12 carbon atoms and 0 to 6, preferably 0 to 2 double or triple bonds; cycloalkyl containing 3 to 20, preferably 5 to 12 carbon atoms; aralkyl containing in the alkyl portion 1 to 10, preferably 1 to 4 carbon atoms, and in the aryl portion 6 to 18, preferably 6 to 12 carbon atoms; aryl containing 6 to 18, preferably 6 to 12 carbon atoms and 1 to 4 rings; and heterocyclic compounds containing up to 4 hetero atoms selected from the group consisting of oxygen, nitrogen and sulphur atoms, and containing 3 to 20, preferably 3 to 14 carbon atoms and 1 to 4 rings.

The functionally modified keto, hydroxy, and carboxyl groups which can be present as substituents on the hydrocarbon residue include ester, ether, ketal, acetal groups, and hydrazones, oximes, semicarbazones, enamines. Suitable functionally modified amino groups include acylamines, alkylamines and enamines.

It is preferred to employ as starting compounds those in which Y is a hydrocarbon residue substituted by a cyclic hydrocarbon residue, or by a residue capable of undergoing ring closure reaction with the formation of a condensed ring system. Preferred examples of the latter residues are those of Formulae III to VII, as follows:

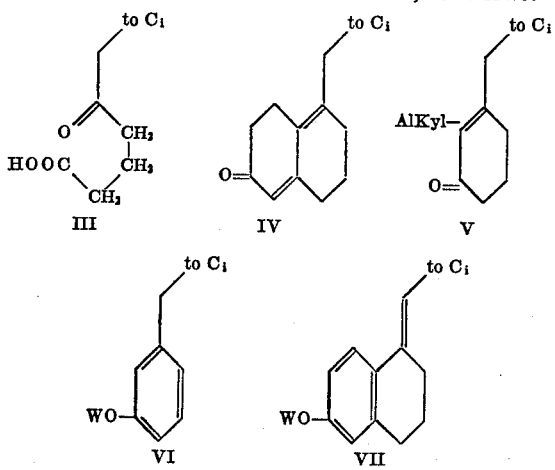

wherein the carboxyl group or carbonyl group of Formula III can also be present in a functionally altered form and W is a hydrogen atom or preferably an ether or ester group which can, if desired, be additionally substituted or interrupted by hetero atoms.

Examples of the esterified hydroxy groups are those wherein W is the acyl radical of an acid containing 1 to 18, preferably 2 to 12 carbon atoms, wherein the acyl group is the acyl radical of, for example, an aliphatic acid containing 1 to 18, preferably 1 to 5 carbon atoms, e.g., formic, acetic, propionic, butyric, isobutyric, α-ethylbutyric, valeric, isovaleric, α-ethylvaleric, trimethylacetic, 2-methylbutyric, 3-ethylbutyric, hexanoic, diethylacetic, triethylacetic, enanthic, octanoic, undecylic and palmitic, a cyclic acid, preferably a cycloaliphatic acid, containing, e.g., 5 to 18, preferably 5 to 12 carbon atoms, e.g., cyclopropylideneacetic, cyclobutylcarboxylic, cyclopentylcarboxylic, cyclopentylacetic, β-cyclopentylpropionic, cyclohexyl, cyclohexylacetic and β-cyclohexylpropionic acid; a carbocyclic aryl or alkaryl acid, e.g., containing 6 to 18, preferably 6 to 12 carbon atoms, and 1 to 5, preferably 1 or 2 rings, e.g., benzoic, 2-, 3-, or 4-methylbenzoic, 2,3-, 2,4-, 2,5-, 2,6-, 3,4- and 3,5-dimethylbenzoic, ethylbenzoic, 2,4,6-trimethylbenzoic, cinnamic and 3-methyl-α-naphthoic acid; and aralkyl acid, e.g., containing 7 to 18, preferably 7 to 12, carbon atoms, e.g., phenylacetic, β-phenylpropionic, diphenylacetic, biphenylacetic and α-naphthylacetic acid; a dibasic acid, e.g., containing 2 to 18, preferably 2 to 12 carbon atoms and 2 to 4, preferably 2 acid groups, e.g., succinic, glutaric, α-methylglutaric, β-methylglutaric, β,β-dimethylglutaric, adipic, pimelic and suberic acid; a hydroxy acid, e.g., containing 2 to 18, preferably 2 to 12 carbon atoms and 1 to 5 hydroxy groups, e.g., glycolic, lactic, citric, tartaric, d-maleic, d-glyceric, mannoic, gluconic and salicylic acid; an amino acid, e.g., glycine, aminopropionic, diglycollamic, triglycollamic, methylglycine, dimethylglycine, diethylglycine, para-aminosalicylic and para-aminobenzoic acid; other heterosubstituted acids containing one, two or more of halo, alkoxy, acyloxy, sulfonyloxy, amino, sulfato, nitro, mercapto, cyano, etc., in the molecule, ethylmercaptoacetic, benzylmercaptoacetic chloroacetic, fluoroacetic, trichloroacetic, trifluoroacetic, thioglycolic, m-nitrobenzoic, 2,3,4-trimethoxybenzoic, phenoxyacetic α-naphthoxyacetic and β-pyrrolidylpropionic acid; carbamic acids, e.g., carbamic acid, phenylcarbamic, n-butylcarbamic, dimethylcarbamic, dethylcarbamic and allophanic acid; a heterocyclic acid, e.g., β-furylcarboxylic, pyrole-carboxylic, N-methylpyrrolidyl-2-carboxylic, α-picolinic, nicotinic, indole-2-carboxylic, 6-hydroxyindolyl-3-acetic and N-methylmorpholyl-2-carboxylic and pyrrolyl-2-carboxylic acid.

In the starting compounds of this invention, W can also be a sulfonyl group, e.g., arylsulfonyl, benzenesulfonyl, p-toluenesulfonyl, m,m'-dimethylbenzenesulfonyl, o,o'-dimethylbenzenesulfonyl, sym.-trimethylbenzenesulfonyl, sym.-triethylbenzenesulfonyl, m-ethylbenzenesulfonyl, para-isopropylbenzenesulfonyl, m-n-butylbenzenesulfonyl, or is alkylsulfonyl, e.g., methanesulfonyl, ethanesulfonyl, propanesulfonyl, isopropanesulfonyl, butanesulfonyl, tert.-butanesulfonyl, pentanesulfonyl, isopentanesulfonyl, hexanesulfonyl, heptanesulfonyl, octylsulfonyl or heterocyclic sulfonyl, e.g., α-pyridinesulfonyl, α-pyranesulfonyl, α-thiophensulfonyl, α-furansulfonyl, α-tetrahydrofuransulfonyl, or other alkyl-, carbocyclic and heterocyclic aryl-, alkaryl- and aralkyl-sulfonyl group, preferably one containing 1–8 carbon atoms and 0–2, preferably 0–1 N, S or O heteroatoms, which are preferably ring carbon atoms, in the heterocyclic ring.

The group WO- can also be an ether group, e.g., wherein W is alkyl of 1–12, preferably 1–4 carbon atoms, preferably methyl, aralkyl, e.g., benzyl, or other ether group conventional in steroid chemistry.

Equivalents of Y groups containing a keto group are those in which the keto group is in the form of a functional derivative thereof regenerable to a keto group, e.g., di-lower-alkyl or alkylene ketals, thioketals, hemi-thioketals, enol ethers, thioenol ethers, enol acylates, and enamines, preferably containing 1 to 8 carbon atoms, e.g., dimethyl, diethyl, ethylene, trimethylene and propylene ketals and thioketals, phenylthioketal, methyl, ethyl and benzyl enol and thioenol ethers, β-hydroxyethyl thioenol ether, enol acetate and pyrrolidyl, piperidyl and morpholyl enamines. It will be apparent to those skilled in the art that such functional groups can readily be formed only when the A ring is saturated or contains a single double bond conjugated with the keto group.

The two Z substituents of Formula I jointly represent a cyclic residue. Preferred starting compounds are those of the formula

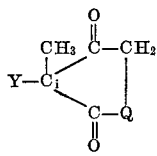

(X)

wherein Q is —CH$_2$—CH$_2$— or —CH$_2$—, preferably —CH—, especially those wherein Y is one of Formulae III–VII.

The optically active antipode (II) produced by the process of this invention can, if desired, be cyclized in a stereospecific manner via the substituents Y and Z or Z' by conventional chemical methods, preferably after other reactive groups in the molecule are masked to prevent the reaction thereof.

The cyclization can be conducted according to convention methods and processes, e.g., described in J. Chem. Soc. [London], 5072 (1963) by G. H. Douglas et al.

In practice, Y of the optically active antipode (II) can be cyclized via the keto group of Z or the hydroxy group of Z'.

Suitable substituents of Y which can undergo ring closure reactions are, for example, the keto, carboxyl, aldehyde, hydroxyl and amino groups, and activated —CH$_2$— or —CH-groups of a C=C double bond. The ring closure can be carried out by any of the conventional reaction routes, although the preferred reaction scheme involves dehydration with ring closure.

The stereospecific process of the invention is particularly valuable in the total synthesis of steroids, for the production of active steroid substances, and also in the production of their intermediates which can then be further converted, in the conventional manner, to the various steroid hormones. In the manufacture of steroids, the racemate is most commonly produced by formation of an asymmetric C-atom 13 in a sterically non-specific ring closure reaction involving the C$_{14}$ and C$_{17}$ keto groups, for example, as shown by the following reaction scheme:

to employ as the starting materials optically active compounds of the formula:

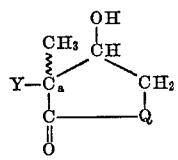

XII wherein C$_a$, Y and Q have the values given above.

In this preferred embodiment, one of the keto groups is selectively converted microbiologically to a hydroxy group so that the C$_1$ symmetric carbon atom becomes the asymmetric C-atom C$_a$ of an optically active antipode having one or more centers of asymmetry, of Formula XIIIa or XIIIb:

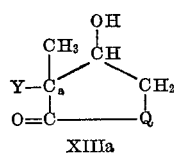 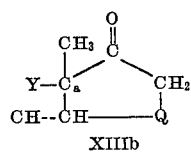

XIIIa             XIIIb wherein Q and Y have the values given above, preferably wherein Q is —CH$_2$— and Y is one of Formulae III–VII, especially those of Formulae VI and VII wherein W is hydrogen or alkyl containing 1 to 7 carbon atoms.

The residual keto group of the product of Formula XIIIa can, if desired, be condensed with Y, optionally after masking the thus-formed hydroxyl group, ring closure thereby being effected. The same ring closure can be effected by starting from the 14α-hydroxy compound of Formula XIIIb, after blocking the residual keto group.

The compounds obtained after the ring closure is effected can be easily converted by conventional methods to the corresponding estrone or estradiol derivative. For example, the conversion can be effected by reducing double bonds present, oxidizing the 17-hydroxyl group, optionally after preliminary saponification of the 17-ester group, and, if a modification in configuration in the 17-position is to be achieved, again to reduce this group to the OH-group. In the same manner, the WO-group substituted in the 3-position can, depending upon the significance of W, be converted to the ultimately desired form; a free hydroxyl group can be produced by decomposition of an ether or by saponification, whereas, on the other hand, the free hydroxyl group can be functionally converted in the conventional manner by etherification or esterification.

Similarly, any of the class of compounds disclosed as starting materials for the process of U.S. Pat. 3,432,393,

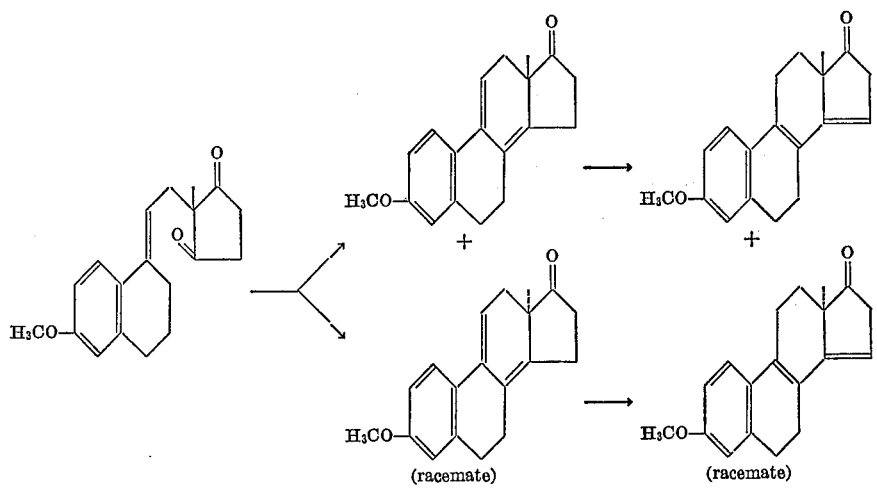

When using the product of the present process in the total synthesis of optically active steroids, it is preferred i.e., compounds of Formula X herein wherein Y has the values given for R' for Formula I of the patent, can be employed in the process of this invention, including the specific compounds employed as starting materials for the detailed examples, e.g., wherein Y is an aliphatic carbon chain having from 4 to 18 carbon atoms, said carbon chain having functional groups selected from the group consisting of hydrogens, ketones, carboxyls, carboalkoxys, hydroxyls, alkoxys, halogens, double bonds, alkyls, aralkyls, aryls and cyclohexyls and decahydronaphthylethyl bearing one or more hydrogens, ketones, hydroxyls, halogens, alkoxyls, double bonds and alkyls.

Depending upon the fermentation system employed, the hydroxyl group of the product is obtained in the 17-position in the β-configuration or in the 14-position in the α-configuration.

The 17β-hydroxy compounds of the Formula XIIIa are produced by fermentation of the diones of the general Formula X with living cultures of *Saccharomyces uvarum* and *Saccharomyces chevalieri* under fermentation conditions conventionally used for the production of ethanol from glucose. Such conditions may be, for example, growing the yeasts in a medium containing about 2% to 10% of glucose and 1% to 5% of corn-steep-liquor under agitation and aeration. Furthermore it will be suitable to add about 1% to 5% ethanol to the yeast cultures. This can be done for example utilizing an ethanolic substrate solution.

Using fermentation conditions under which *Saccharomyces uvarum* and *Saccharomyces chevalieri* produces no ethanol and by adding no ethanol to the cultures, there will be obtained the 14α-compounds of the general Formula XIIIb, especially in the case, when Q is —CH₂—. These conditions may be realized for example by fermentation with resting cells or with yeast dry powder under conventional conditions. The preferred method for producing the 14α compounds of the Formula XIIIb is the fermentation of the diones with living cultures of *Aspergillus ochraceus*, *Bacillus esterificans* and *Bacillus thuringiensis* under conventional fermentation conditions, well known by the artisan.

The compound having a 17 - hydroxy group in the β-configuration are particularly valuable in the preparation of steroid hormones. Exemplary of the chemical conversion of an 8(14)-seco-compound are the following reaction schemas:

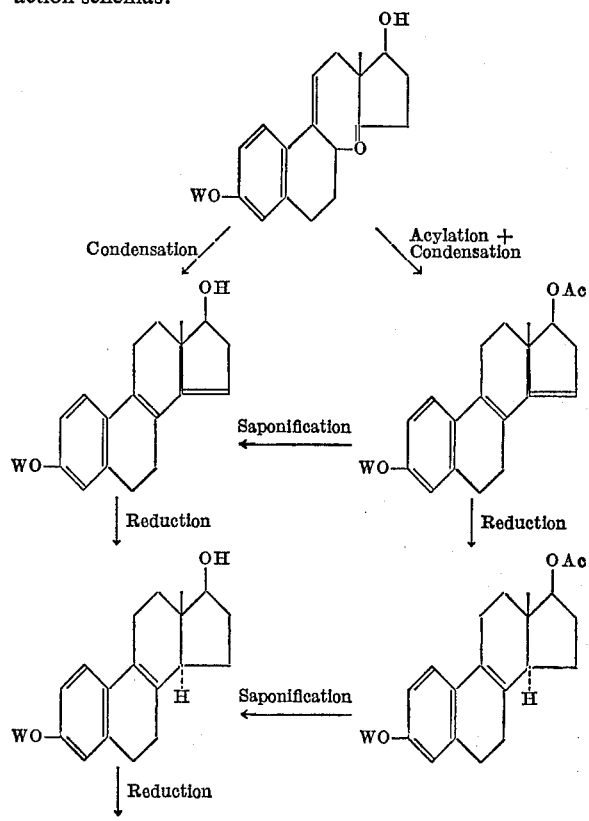

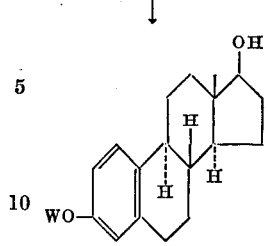

Especially valuable intermediates produced by the process of this invention are, for example, the 3-ethers of 13β-methyl-8(14)-seco-1,3,5(10),9(11)-estrapentaene-3, 17β-diol-14-one and 13β-methyl-1,3,5(10),8(9),14-estrapentaene-3,17β-diol, and 1-methyl-1-(6-carboxy-3-ketohexyl)-cyclopentane-2-ol-5-one.

These compounds are particularly valuable as starting materials in the production of estrone andestradiol and derivatives thereof.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Preparation of 3-methoxy-8(14)-seco-1,3,5(10),9(11)-estratetraen-14α-ol-17-one by fermentation with bacteria (a) Reduction with *Bacillus esterificans* (BBA-Western Berlin) (fermentation by means of bacteria in a shaken flask).—A 2 l. Erlenmeyer flask containing 500 cc. nutrient solution comprising 0.5% glucose, 0.2% corn steep liquor, 0.5% yeast extract, and 0.1% peptone (Merck) is sterilized and then inoculated with a suspension of *Bacillus esterificans* obtained by flushing an inclined agar culture with physiological saline solution. The preliminary culture is shaken at 30° C. for one day at a frequency of 145 r.p.m. 50 cc. aliquot portions of this culture are transferred into each of four 2 l. fermentation flasks, each containing 450 cc. of the same nutrient solution. These flasks are then shaken for four hours at 30° C., 5 cc. of a 2% ethanolic solution of 3-methoxy-8(14)-seco-1,3,5(10),9(11)-estratetraen-14,17-dione is added to each flask, and the mixture fermented for a further 20 hours.

The fermented suspension is extracted twice with methyl isobutyl ketone and the extract is concentrated to a small volume under vacuum at 45° C. bath temperature. The concentrate is purified by preparative thin film chromatography using silica gel GF₂₅₄ (E. Merck AG, Darmstadt, Germany) as the absorbent and, as the running agent, benzene/ethyl acetate, in a volume ratio of 9:1.

The main zone of the chromatogram which is visible under short wave length ultraviolet light (having an $R_F$ value of approximately 0.4) is separated off, eluted with 100 cc. of methylene chloride at room temperature, the eluate concentrated at 25° C., and the residue recrystallized from 10 parts of diisopropyl ether. There is obtained 3 - methoxy - 8(14) - seco - 1,3,5(10),9(11)-estratetraen- -14α-ol-17-one, M.P. 101/102–104° C.

(b) Reduction with *Bacillus thuringiensis* (BBA-Darmstadt) (fermentation with bacteria in a fermenter).—A 50 l. stainless steel fermenter is charged with 30 l. nutrient medium comprising:

| | Percent |
|---|---|
| Glucose | 0.5 |
| Yeast extract | 0.5 |
| Corn steep liquor | 0.2 |
| Peptone (Merck) | 0.1 | and is then sterilized by heating for half an hour at 120° C., and inoculated with 1 liter of a one day old agitated culture of *Bacillus thuringiensis.*

(The inoculum is obtained under the same conditions as described for the culturing flasks in Example 1(a).)

After fermenting for one day at 29° C. with stirring (220 r.p.m.) and aeration (1.65 $m.^3$/h.), 1.8 l. of the culture are transferred, under sterile conditions, into a fermenter of equal size containing 28 l. of the same nutrient solution. After 6 hours' culturing with stirring and aeration as above, silicone oil SH+5% lard oil are added as an anti-foaming agent, a solution of 15.0 g. of 3-methoxy-8(14)-seco-1,3,5(10),9(11)-estratetraen-14,17 - dione in 800 cc. of ethanol is added, and the mixture fermented for an additional 16 hours. Thereafter, the fermenter suspension is twice extracted with 15 l. portions of methyl isobutyl ketone, the extract concentrated under vacuum at 45° C. to yield a viscous syrup, and the latter dissolved in 150 cc. of isopropyl ether. After 20 hours of standing at 0° C., the crystals which separate are filtered off, washed with a small amount of ice cold isopropyl ether, and dried at 60° C. under vacuum. Yield: 13.1 g. of 3-methoxy-8(14)-seco-1,3,5(10),9(11) - estratetraen - 14α-ol-17-one (87% of theory), M.P. 98/99–100° C.

This substance can be further purified by recrystallization from 4 parts of alcohol.

EXAMPLE 2

Preparation of 3-methoxy-8(14)-seco-1,3,5(10),9(11)-estratetraen-17β-ol-14-one by fermentation with yeasts Reduction wtih *Saccharomyces uvarum* (CBS 1508) (fermentation with yeast in a fermenter).—A 50 l. stainless steel fermenter is charged with 30 l. of a nutrient solution comprising 5% glucose and 2% corn steep liquor, and sterilized by heating for half an hour at 120° C. The solution is then inoculated with 1 liter of an agitated, one day old culture of *Saccharomyces uvarum* (CBS 1508).

The inoculum is produced by flushing an inclined agar culture with physiological saline solution and preparing 500 cc. of a preliminary culture from each slant, which was agitated at 30° C. for one day at 145 r.p.m. 50 cc. aliquots of the preliminary cultures were then used to inoculate 450 cc. portions of the fermentation culture.

After fermentation for one day at 29° C. with stirring (220 r.p.m.), and aeration (1.65 $mm.^3$/h.), 1.8 l. of the culture are transferred under sterile conditions into another 50 l. fermenter containing 28 l. of the above nutrient solution. After 6 hours of culturing with stirring and aeration as above, silicone oil SH+5% lard oil are added as anti-forming agent, a solution of 45.0 g. of 3-methoxy-8(14)-seco-1,3,5(10),9(11)-estratetraen-14,17 - dione in 800 cc. of ethanol is added, and the mixture fermented for an additional 19 hours.

Thereafter, the fermenter suspension is twice extracted with 15 l. portions of methyl isobutyl ketone, the extract concentrated under vacuum at 45° C. to a syrup, the syrup treated with 400 cc. of diisopropyl ether, and the resulting solution allowed to stand for 16 hours at 0° C.

The resulting crystals are filtered off, washed with 25 cc. of ice cold diisopropyl ether and dried under vacuum at 60° C. Yield: 31.8 g. 3-methoxy-8(14)-seco-1,3,5(10), 9(11)-estratetraen-17β-ol-14-one (71% of theory), M.P. 106–108–109° C., $\alpha_D^{20}$ −34.5 (dioxane, c.=1), $\epsilon_{260}$ =20100.

This compound can be further purified by recrystallization from four parts of ethanol.

EXAMPLE 3

Preparation of 3-methoxy-8(14)-seco-1,3,5(10),9(11)-estratetraen-14α-ol-17-one by fermentation with *Saccharomyces uvarum* (CBS 1508) by the resting cell method A 30 l. pre-fermentation culture of the *Saccharomyces uvarum* produced as described in Example 2(a) is centrifuged. The resulting yeast is washed with distilled water, again centrifuged, and suspended in 30 l. of distilled water. 500 cc. at a time of this suspension are charged into each of eight 2 l. Erlenmeyer flasks, and these are closed with a plug of cotton wool and shaken at 30° C. at a frequency of 145 r.p.m. After 4 hours, 250 mg. of 3-methoxy-8(14)-seco-1,3,5(10),9(11)-estratetraen-14,17-dione, dissolved in 2.5 cc. of methyl Cellosolve, are added to each flask and the mixture fermented for a further 20 hours. Then, the fermentation charges are combined, extracted twice with 1 liter of methyl isobutyl ketone at a time, the extract evaporated to dryness under vacuum at 45° C. bath temperature, and the residue crystallized once from a benzene/hexane mixture and once from ethanol. There is obtained 3-methoxy-8(14)-seco-1,3,5(10),9(11)-estratetraen-14α-ol-17-one, M.P. 101/102–103° C., $(\alpha)_D$ +45.4° (dioxane, c.=1).

EXAMPLE 4

Preparation of 3-methoxy-8(14)-seco-1,3,5(10),9(11)-estratetraen-14α-ol-17-one by fermentation with *Saccharomyces uvarum* (CBS 1508)—dry powder The yeast is obtained from a 30 l. pre-fermentation culture of CBS 1508 as described in Example 3. This yeast is suspended in 3 l. of acetone, the suspension is stirred for 15 minutes, the yeast filtered off and re-suspended in 3 l. of acetone, the mixture stirred, and the yeast filtered off and dried for 3 hours under vacuum at room temperature.

The dry powder obtained is suspended in 30 l. of distilled water and this suspension is used for the fermentation.

The fermentation of the 3-methoxy-8(14)-seco-1,3,5(10),9(11)-estratetraen-14,17-dione and the working-up of the charges takes place as described in Example 4. 3-methoxy-8(14) - seco - 1,3,5(10),9(11)-estratetraen-14α-ol-17-one is obtained, M.P. 100/102–103° C., $(\alpha)_D$ +43° dioxane (c.=1).

EXAMPLE 5

Preparation of 3-methoxy-8(14)-seco-D-homo-1,3,5(10),9(11)-estratetraen-17β-ol-14-one 1.6 g. of 3-methoxy-8(14)-seco-D-homo-1,3,5(10), 9(11)-estratetraen-14,17-dione are fermented with an acetone dry powder of *Saccharomyces uvarum* (CBS 1508), as described in Example 4. The crude product obtained is purified by preparative thin film chromatography as described in Example 1, and recrystallized from isopropyl ether. There is obtained 3-methoxy-8(14)-seco-D-homo-1,3,5(10),9(11)-estratetraene-17β-ol-14-one, M.P. 115–116.5° C., $(\alpha)_D$ +28.5° (dioxane, c.=1).

EXAMPLE 6

Preparation of 2-methyl-3-methoxy-8(14)-seco-1,3,5(10),9(11)-estratetraen-14α-ol-17-one 500 cc. of a suspension of *Saccharomyces uvarum* (CBS 1508)—dry powder (Example 4) are charged into each of sixteen 2 l. Erlenmeyer flasks; these are closed with a plug of cotton wool and shaken at 30° C. at a frequency of 145 r.p.m.

After one hour, 100 mg. of 2-methyl-3-methoxy-8(14)-seco-1,3,5(10),9(11)-estratetraen-14,17-dione are added to each flask, and the mixture shaken for a further 48 hours. The fermentation charges are then combined, twice extracted with 2 l. portions of methyl isobutyl ketone, the extract concentrated under vacuum at 45° C. bath temperature, the residue purified by preparative thin film chromatography as described in Example 1, and the product crystallized from isopropyl ether. There is obtained 2-methyl-3-methoxy-8(14) - seco - 1,3,5(10),9(11)-estratetraen-14α-ol-17-one, M.P. 135–137° C., $(\alpha)_D^{20}$ +47.8° (dioxane, c.=1).

According to the NMR spectrum, the hydroxyl group is in the α-position relative to 13β-methyl group.

The starting compound is produced in a conventional manner as follows: 6-methoxy-7-methyl tetralin is oxidized with chromic acid to 6-methoxy-7-methyl tetralone-1 (M.P. 102–104° C.), wherefrom there is obtained after conducting a Grignard reaction with vinyl magnesium bromide and subsequent condensation of the thus-obtained "viscol" with 2-methyl-cyclopentanedione-1,3, the 2-methyl-3-methoxy-8(14) - seco - 1,3,5(10),9(11)-estratetraene-14,17-dione (M.P. 101–103° C.).

EXAMPLE 7

Preparation of 4-methyl-3-methoxy-8(14)-seco-1,3,5(10),9(11)-estratetraen-17β-ol-14-one 30 l. of a suspension of Saccharomyces uvarum (CBS 1508)—dry powder, as prepared in Example 4, are stirred at 200 r.p.m. in a stainless steel fermenter at 30° C., and aerated with 300 l. of air per hour. 3.0 g. of 4-methyl-3-methoxy-8(14)-seco-1,3,5(10),9(11)-estratetraen-14,17-dione dissolved in 800 cc. of ethanol are added and the mixture stirred for 48 hours with aeration and for a further 60 hours without aeration. The product is then extracted in the usual way with methyl isobutyl ketone, the extract concentrated, the residue fractionated by preparative thin film methods, and the crude product obtained is recrystallized from isopropyl ether.

There is obtained 4-methyl-3-methoxy-8(14)-seco-1,3,5(10),9(11)-estratetraen-17β-ol-14-one, M.P. 167–168° C., $(\alpha)_D$ −43.6° (dioxane, c.=1).

According to the NMR spectrum, the hydroxyl group is in the β-position relative to the 13β-methyl roup.

The starting product is produced in a conventional manner as follows: 5-methyl-6-methoxy-tetralone-1 is subjected to a Grignard reaction by means of vinyl magnesium chloride, and the resulting corresponding "vinol" is condensed with 2-methylcyclopentanedione to 3-methoxy - 4 - methyl-8(14) - seco - 1,3,5(10),9(11)-estratetraen-14,17-dione (M.P. 154–155° C.).

EXAMPLE 8

Preparation of 1-methyl-3-methoxy-8(14)-seco-1,3,5(10),9(11)-estratetraen-14α-ol-17-one 1.6 g. of 1 - methyl - 3-methoxy-8(14)-seco-1,3,5(10), 9(11)-estratetraen-14,17-dione are fermented and worked up in 16 fermentation flasks with Saccharomyces uvarum (CBS 1508). 500 cc. of a nutrient solution comprising 5% glucose and 2% corn steep liquor are charged into a 2 l. Erlenmeyer flask. The solution is sterilized and then inoculated with a suspension of Saccharomyces uvarum (CBS 1508) obtained by flushing an inclined agar culture with physiological saline solution. The preliminary culture is agitated at 30° C. for one day at a frequency of 145 r.p.m. 50 cc. of aliquot portions of this culture are then transferred each into four 2 l. fermentation flasks, each of which contains 450 cc. of this same nutrient solution. These flasks are then shaken for 6 hours at 30° C., 5 cc. of a 2% ethanolic solution of 1-methyl 3 - methoxy - 8(14)-seco-1,3,5,(10),9(11)-estratetraen-14,17-dione is added to each of the fermentation flasks, and the mixture fermented for a further 20 hours.

The combined fermentation charges are twice extracted with methyl isobutyl ketone, and the extract is concentrated to approximately 5 cc. under vacuum at 45° C. bath temperature. The concentrate is purified by preparative thin film chromatography using silica gel GF$_{254}$ (E. Merck AG, Darmstadt, Germany) as the absorbent and, as the running agent, benzene/ethyl acetate. in a volume ratio of 9:1.

The main zone of the chromatogram which is visible under short wave length ultraviolet light (having an R$_F$ value of approximately 0.4) is separated off, eluted with 100 cc. of methylene chloride at room temperature, the eluate concentrated at 25° C., and the residue recrystallized from 10 parts of diisopropyl ether.

There is obtained 1-methyl-3-methoxy-8(14)-seco-1,3, 5(10),9(11)-estratetraen-14α-ol-17-one; M.P. 93 94–95° C.; $(\alpha)_D^{20}$ +23° (dioxane, c.=1); $\epsilon_{260}$=20100.

EXAMPLE 9

Preparation of 1 - methyl - 1 - (6 - carboxy - 3-ketohexyl)-cyclopentan - 2 - ol - 5 - one and 4-(2'-carboxyethyl)-8-methyl-4,9-dehydro-hydrindan-1-ol-5-one 4.0 g. 1 - methyl - 1-(6-carboxy-3-ketohexyl)-cyclopentane-2,5-dione ethyl ester are fermented and worked up to a concentrate, under the conditions described in Example 8, in 32 fermentation flasks with Saccharomyces uvarum (CBS 1508).

The 1 - methyl-1-(6-carboxy-3-ketohexyl)-cyclopentan-2-ol-5-one thus obtained can be isolated by column chromatography only with difficulty. Therefore, the concentrate, which is dry, is mixed with 25 ml. 5 N HCl, in order to cyclize the compound, and then heated under reflux for one hour. After the solution has cooled, the reaction mixture is extracted with chloroform, the chlorofoam phase is washed with a small amount of water, dried with Na$_2$SO$_4$, and concentrated to dryness under vacuum. The residue is separated in a column filled with acid-washed silica gel by means of chloroform-methanol gradients; this column combines the fractions containing the 4-(2'-carboxyethyl)-8-methyl-4,9-dehydro-hydrindan-1-ol-5-one. The fractions thus combined are concentrated to dryness under vacuum at a bath temperature of 35° C., mixed with a small amount of water, and then crystallized by cooling to 0° C.

There is obtained 4-(2'-carboxyethyl)-8-methyl-4,9-dehydro-hydrindan-1-ol-5-one monohydrate; M.P. 106/108–109° C.; $(\alpha)_D$ +28° (acetone).

EXAMPLE 10

Preparation of 6-thia-8(14)-seco-1,3,5(10),9(11)-estratetraen-14α-ol-17-one 3.2 g. of 6-thia-8(14)-seco-1,3,5(10),9(11)-estratetraen-14,17-dione, dissolved in 320 ml. of ethanol, are fermented under the same conditions as described in Example 8 for 16 hours, using Saccharomyces uvarum (CBS 1508), in 32 fermentation flasks (each 500 ml.), and worked up to the crude product. The latter is purified in a silica-gel column by means of hexanacetone gradients, and there is obtained 6-thia-8(14)-seco-1,3,5(10),9(11)-estratetraen-14α-ol-17-one in the form of syrup;

$$(\alpha)_D = +27°$$

(dioxane, c.=1).

EXAMPLE 11

3-methoxy-8,14-seco-1,3,5(10),9-estratetraen-17β-ol-14-one (a) Germination culture.—Three 2 l. Erlenmeyer flasks containing respectively 500 cc. of nutrient solution of 5% glucose and 2% corn steep liquor are sterilized and then inoculated each with a suspension of Saccharomyces uvarum (CBS 1508) obtained by flushing a tilted agar culture with physiological NaCl solution. The germination culture is shaken for one day at 30° C. at 145 r.p.m.

(b) Subculture.—A 50 liter fermentor of stainless steel is charged with 30 l. of nutrient solution of 5% glucose and 2% corn steep liquor, sterilized for 30 minutes at 130° C., and after cooling to 29° C., inoculated with 1.5 l. of germination culture. The subculture is allowed to grow for one day at 29° C. under agitation at 220 r.p.m. and aeration with 1.65 m.$^3$/hour.

(c) Fermentation.—A 380 liter fermentor of stainless steel is charged with 235 l. of the above-mentioned nutrient solution, sterilized, and then inoculated with 15 l. of the subculture. The culture is allowed to grow for 6 hours under agitation at 220 r.p.m. and aeration with 1.65 m.$^3$/hour, and then 250 g. of 3-methoxy-8,14-seco-1,3,5(10),9-estratetraen-14,17-dione, dissolved in 6.7 l. of ethanol, is added thereto. The same addition step is repeated 2, 4 and 6 hours later, and the fermentation is continued until the substrate is converted to an extent of about 95% (duration: about 40 hours).

(d) Isolation.—After termination of the fermentation, the fermentation suspension is extracted twice with respectively 100 l. of methyl isobutyl ketone, and the extract is concentrated under vacuum to 1.2–1.3 l. at a bath temperature of about 45° C.

The concentrate is allowed to stand for about 16 hours; then the crystals are vacuum-filtered, washed with about 100 cc. of ice cold methyl isobutyl ketone, and dried at 60° C. under vacuum, thus obtaining 644 g. of 3-methoxy-8,14-seco 1,3,5(10),9-estratetraen-17β-ol-14-one (64% of theory), M.P. 110–112° C. $[\alpha]_D^{20} = -35.5°$ (dioxane, c.=1%). From the mother liquors, by concentrating, an additional 132 g. is obtained which, recrystallized from ethanol, yield 93 g. of pure product. Total yield: 737 g. (74% of theory).

Under the same conditions, the substrate can also be fermented with *Saccharomyces chevalieri* (NCYC 91). In this case, yields of 81–83% of theory are obtained.

EXAMPLE 12

Preparation of 3-methoxy-8(14)-seco-1,3,5(10),9(11)-estratetraene-14α-ol-17-one by fungal fermentation with *Aspergillus ochraceus* (CBS)

(a) (Fermentation with fungal strains in a shaken flask).—A 2 l. Erlenmeyer flask was charged with 500 cc. of a nutrient solution containing:

| | Percent |
|---|---|
| Glucose | 3 |
| Corn steep liquor | 1 |
| NaNO$_3$ | 0.2 |
| K$_2$HPO$_4$ | 0.2 |
| KH$_2$PO$_4$ | 0.1 |
| MgSO$_4$ | 0.05 |
| KCl | 0.05 |
| FeSO$_4$ | 0.002 | and sterilized by heating for half an hour to 120° C., whereupon the mixture was cooled and inoculated with a suspension of *Aspergillus ochraceus* which is obtained by rinsing an inclined agar culture wth physiological saline solution.

The preliminary culture is shaken for 2 days at 30° C. at a frequency of 145 r.p.m., and 50 cc. aliquot portions of the culture are then transinoculated into each of ten 2 l. fermentation flasks, each containing 450 cc. of the above-described nutrient solution. These flasks are then shaken for 16 hours at 30° C., 5 cc. of a 2% ethanolic solution of 3-methoxy-8(14)-seco-1,3,5(10),9(11)-estratetraene-14,17-dione are added to each flask under sterile conditions, and the mixture fermented for an additional 24 hours.

The combined fermentation charges are twice extracted wtih 2500 cc. portions of methyl isobutyl ketone, and the extract is concentrated to approximatelly 5 cc. under vacuum at 45° C. bath temperature. The concentrate is purified by preparative thin film chromatography using silica gel GF$_{254}$ (E. Merck AG, Darmstadt, Germany) as the absorbent and, as the running agent, benzene/ethyl acetate, in a volume ratio of 9:1.

The main zone of the chromatogram which is visible under short wave length ultraviolet light (having an R$_F$ value of approximately 0.4) is separated off, eluted with 100 cc. of methylene chloride at room temperature, the eluate concentrated at 25° C., and the residue recrystallized from 10 parts of diisopropyl ether.

There is obtained 3-methoxy-8(14)seco-1,3,5(10),9 (11)-östratetraen-14α-ol-17-one, M.P. 101/102–103.5° C., $[\alpha]_D^{20}$ +47.8° (dioxane, c.=1), $\epsilon_{264}$=20,900.

(b) (Fermentation by fungi in a fermenter).—A 50 l. stainless steel fermenter is charged with 30 l. of a nutrient solution comprising:

| | Percent |
|---|---|
| Glucose | 3 |
| Corn steep liquor | 1 |
| NaNO$_3$ | 0.2 |
| K$_2$HPO$_4$ | 0.2 |
| KH$_2$PO$_4$ | 0.1 |
| MgSO$_4$ | 0.05 |
| KCl | 0.05 |
| FeSO$_4$ | 0.002 |

The solution is sterilized by heating for half an hour at 120° C., and inoculated with 1 l. of an agitated two day old culture of *Aspergillus ochraceus* (CBS).

(The inoculum is prepared under the same conditions as described for the culturing flasks in Example 12a.)

After fermentation for two days at 29° C. with stirring (220 r.p.m.) and aeration (1.65 m.$^3$/h.), 3 l. of the culture are transferred under sterile conditions into a second 50 l. fermenter, together with 27 l. of the above nutrient solution.

After 16 hours of culturing with stirring and aerations as above, Pluronic L 81, acting as an anti-foaming agent, and a solution of 22.5 g. of 3-methoxy-8(14)-seco-1,3,5 (10),9(11)-östrateraen-14,17-dion in 300 cc. of ethanol are added, and the mixture fermented for a further 20 hours. Thereafter, the fermenter suspension is four times extracted with 15 l. portions of toluene, the extract concentrated to a syrup under vacuum at 45° C., and the latter dissolved in 230 cc. of isopropyl ether. After 20 hours of standing at 0° C., the crystals which separate are filtered off, washed with a small amount of ice cold isopropyl ether, and dried at 60° C. under vacuum. Yield: 17.4 of 3-methoxy-8(14)-seco-1,3,5(10),9(11)-estratetraen-14a - ol-17-one (69% of theory), M.P. 100/101–102° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and yithout departing from the spirit and scope thereof, can make various changes and modifications of the invention to adapt it to various usages and conditions.

1. In a process for the production of optically active compounds which comprises subjecting an optically inactive compound to a microbiological enzyme system, said optically inactive compound being a compound of the formula

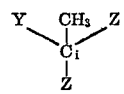

wherein C$_i$ is a symmetric carbon atom and the two Z groups are identical aliphatic groups joined together, each of which bears a keto group, and Y is the organic remainder of the molecule attached by a carbon atom thereof to produce an optically active antipode of the formula

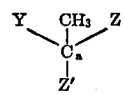

wherein Y and Z have the values given above, C$_a$ is the asymmetrical carbon atom corresponding to C$_i$ and Z' is a ligand otherwise corresponding to Z bearing a hydroxy group, the improvement which comprises employing as the microbiological enzyme system a microorganism selected from the group consisting of *Aspergillus ochraceus*, *Bacillus esterificans*, *Bacillus thuringiensis*, *Saccharomyces chevalieri* and *Saccharomyces uvarum*.

2. A process according to claim 1 wherein the starting optically inactive compound is of the formula

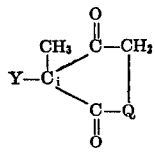

wherein Q is —CH$_2$CH$_2$— or —CH$_2$— and Y is as defined therein.

3. A process according to claim 2 wherein Q is —CH$_2$—.

4. A process according to claim 2 wherein Y is one of the formulae

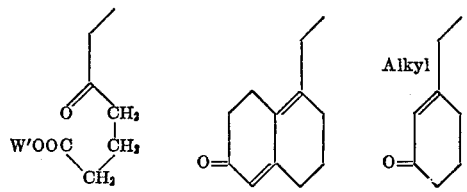

in which W'O is a free or esterified group and in which WO is a free, etherified or esterified group.

5. A process according to claim 4 wherein Y is

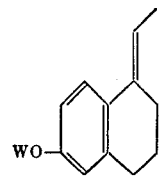

wherein WO is as defined therein.

6. A process according to claim 5 wherein W is CH$_3$ and Q is —CH$_2$—.

7. A process according to claim 1 wherein the microorganism is *Aspergillus ochraceus*.

8. A process according to claim 1 wherein the microorganism is *Bacillus esterificans*.

9. A process according to claim 1 wherein the microorganism is *Bacillus thuringiensis*.

10. A process according to claim 1 wherein the microorganism is *Saccharomyces uvarum*.

11. A process according to claim 1 wherein the microorganisms is *Saccharomyces chevalieri*.

References Cited
UNITED STATES PATENTS 3,432,393    3/1969    Bellet et al. _____ 195—51

ALVIN E. TANENHOLTZ, Primary Examiner

U.S. Cl. X.R.

195—28 R, 29, 30, 49; 260—295.5, 313.1, 319.1, 397, 410.5, 469, 482, 484, 488, 515, 554, 586